United States Patent [19]
Miller

[11] 4,047,173
[45] Sept. 6, 1977

[54] FM PULSE COMPRESSION RADAR

[75] Inventor: Coleman J. Miller, Arnold, Md.

[73] Assignee: Westinghouse Electric Corporation, Pittsburgh, Pa.

[21] Appl. No.: 699,271

[22] Filed: June 24, 1976

[51] Int. Cl.² ............................................. G01S 17/28
[52] U.S. Cl. ............................................ 343/17.2 PC
[58] Field of Search ......................... 343/17.2 PC, 7.7

[56] References Cited

U.S. PATENT DOCUMENTS

| 3,299,427 | 1/1967 | Kondo | 343/17.2 PC |
|---|---|---|---|
| 3,354,456 | 11/1967 | Caputi, Jr. | 343/17.2 PC |
| 3,852,746 | 12/1974 | Lowenschuss et al. | 343/17.2 PC |
| 3,898,660 | 8/1975 | Munster | 343/17.2 PC |

Primary Examiner—Charles T. Jordan
Attorney, Agent, or Firm—R. M. Trepp

[57] ABSTRACT

An FM pulse compression radar for detecting moving targets is described wherein a predetermined sequence of FM signals spaced apart in time is transmitted, each successive FM signal in the sequence having an FM rate determined by a function of the amount of time since the sequence started. A reflected sequence of FM signals may be received wherein signals indicative of a moving target may be integrated in a single range cell.

12 Claims, 10 Drawing Figures

FM PULSE COMPRESSION RADAR

BACKGROUND OF THE INVENTION

1. Field of the Invention

This invention relates to radar systems, particularly to FM pulse compression radar.

2. Description of the Prior Art

In the prior art, frequency modulated pulse compression radars achieved an improved signal-to-noise ratio of target reflected signals when using a transmitter with a limited peak power output by frequency modulating (FM) the transmitted pulse and then collapsing the various frequency components in a target return into a much narrower pulse than the transmitted pulse in the receiver. Ground based air surveillance radars utilizing FM pulse compression techniques have the problem that moving targets tend to "walk through" receiver range cells or bins. Returns from a given target consequently move out of the receiver range bin in a relatively short time. For high target radial velocities this "range walk" phenomenon so severely limits the integration time per range bin that a significant reduction occurs in the signal-to-noise ratio of target reflected signals.

SUMMARY OF THE INVENTION

In accordance with the present invention, a method and apparatus is provided for detecting targets by generating a predetermined sequence of spaced apart FM signals each successive signal in the sequence having an FM rate determined by a function of the amount of time since the sequence started.

DESCRIPTION OF THE PREFERRED EMBODIMENTS

Figure 1:
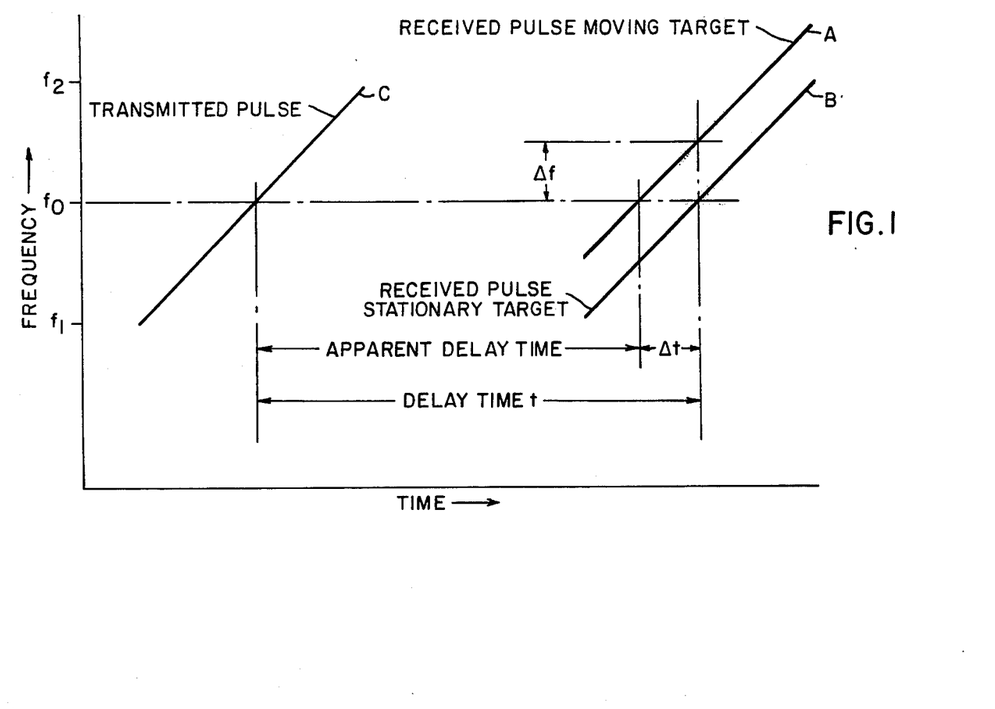
FIG. 1 shows frequency shift due to target motion.

It is well known that in a linear FM pulse compression radar, a moving target gives a range error according to the equation (1).

$$R_i = R + VT \tag{1}$$

were $R_i$ equals the indicated range, $R$ equals the actual range, $V$ equals target radial velocity, and $T$ is a time equal to the carrier frequency divided by the FM rate of the signal transmitted. Consequently, a range error is built into the radar receiver. This is illustrated in FIG. 1, which shows, curve C, a linear FM transmitted signal and curves A and B, two received signals which were reflected from a stationary target and a moving target. The signal received from the stationary target, curve B, is identical to the transmitted signal, curve C, except for a delay time, $$t = 2R/C \tag{2}$$

were $R$ is the target range and $C$ the velocity of radio waves. The signal received from the moving target, curve A, is additionally displaced in frequency by a doppler shift, $$\Delta f = -\frac{2V}{C} f_0 \tag{3}$$

where $V$ is the velocity of the target and $f_0$ the mean transmitted frequency. As can be seen from FIG. 1, the moving target signal appears as a signal at an apparent delay time $t - \Delta t$, where $\Delta t$ is given by $$\Delta t = -\frac{\Delta f}{S_N} \tag{4}$$

and $S_N$ is the FM slope or FM rate of the transmitted FM signal, the change in frequency per unit time. From Equation (2)

$$R = Ct/2,$$

or $$\Delta R = (C/2)\Delta t \tag{5}$$

Substituting Equation (4) in (5) gives $$\Delta R = -\frac{C\Delta f}{2S_N} \tag{6}$$

Substituting Equation (3) in (6) gives $$\Delta R = -\frac{C}{2S_N} \cdot \frac{-2Vf_0}{C} = \frac{Vf_0}{S_N} \tag{7}$$

Letting $T_N$ be defined by equation (8)

$$T_N = f_0/S_N \tag{8}$$

and substituting equation (8) into equation (7), we obtain $\Delta R = VT_N$, or $R_i = R + VT$, which is equation (1).

Figure 2:
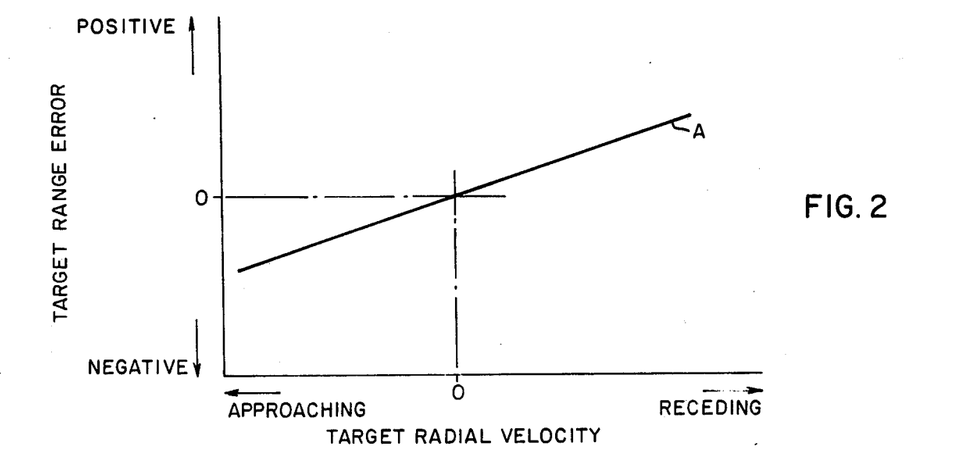
FIG. 2 shows target range error versus target velocity.

The size of the single pulse range error depends upon the time value $T_N$ and the target velocity. Range error is proportional to the target radial velocity. Curve A of FIG. 2 shows the target range error on the ordinate vs. target radial velocity on the abscissa. The scaling of the range error axis is a function of the time value $T_N$ which through equation (8) is a function of the FM slope $S_N$.

If a second pulse is transmitted at time $\tau$ later than the first transmitted pulse, the indicated range is:

$$R_{i2} = R_{i1} + V\tau \tag{9}$$

where $R_{i1}$ is the indicated range from the first pulse, $R_{i2}$ is the indicated range from the second pulse, $V$ is the target radial velocity and $\tau$ is the time between pulses such as the time from the beginning of one pulse to the beginning of the next pulse. Combining equations (1) and (9) by eliminating $R_{i1}$ yields equation (10).

$$R_{i2} = R + VT + V\tau \tag{10}$$

where $T$ is the initial time value $T_1$ corresponding to the FM slope $S_1$ generated in equation (8) for the first FM signal in the sequence. If the time value $T_N$ is modified such that for any N $$T_N + \tau = T_1 \tag{11}$$

where N equals 1, 2, 3 ... and if $$R_{i1} = R_{iN} \tag{12}$$

then $$R_{iN} = R + V(T_N + \tau (N\text{-}1)) \tag{13}$$

and substituting equations (1) and (12) into equation (13) yields equation (14).

$$R + VT_1 = R + V(T_N + \tau(N\text{-}1)) \tag{14}$$

Equation 14 may be reduced to equation (15).

$$T_1 = T_N + \tau (N\text{-}1) \tag{15}$$

Substituting equation (8) into equation (15) for $T_N$ yields equation (16) which is an expression for $S_N$ the FM slope or rate of each FM signal in a sequence of N FM signals.

$$S_N = \frac{f_0}{T_1 - \tau(N-1)} \tag{16}$$

Over a sequence of N transmitted FM pulses, and by controlling the rate time value $T_N$ to obey equation (15) or the value $S_N$ according to equation (16) causes the target to appear to remain at the same indicated range regardless of the target velocity. Consequently, a sufficiently long sequence of N transmitted FM signals may be integrated in a receiver at constant range or in a single range bin to yield an optimum signal-to-noise ratio.

Figure 3:
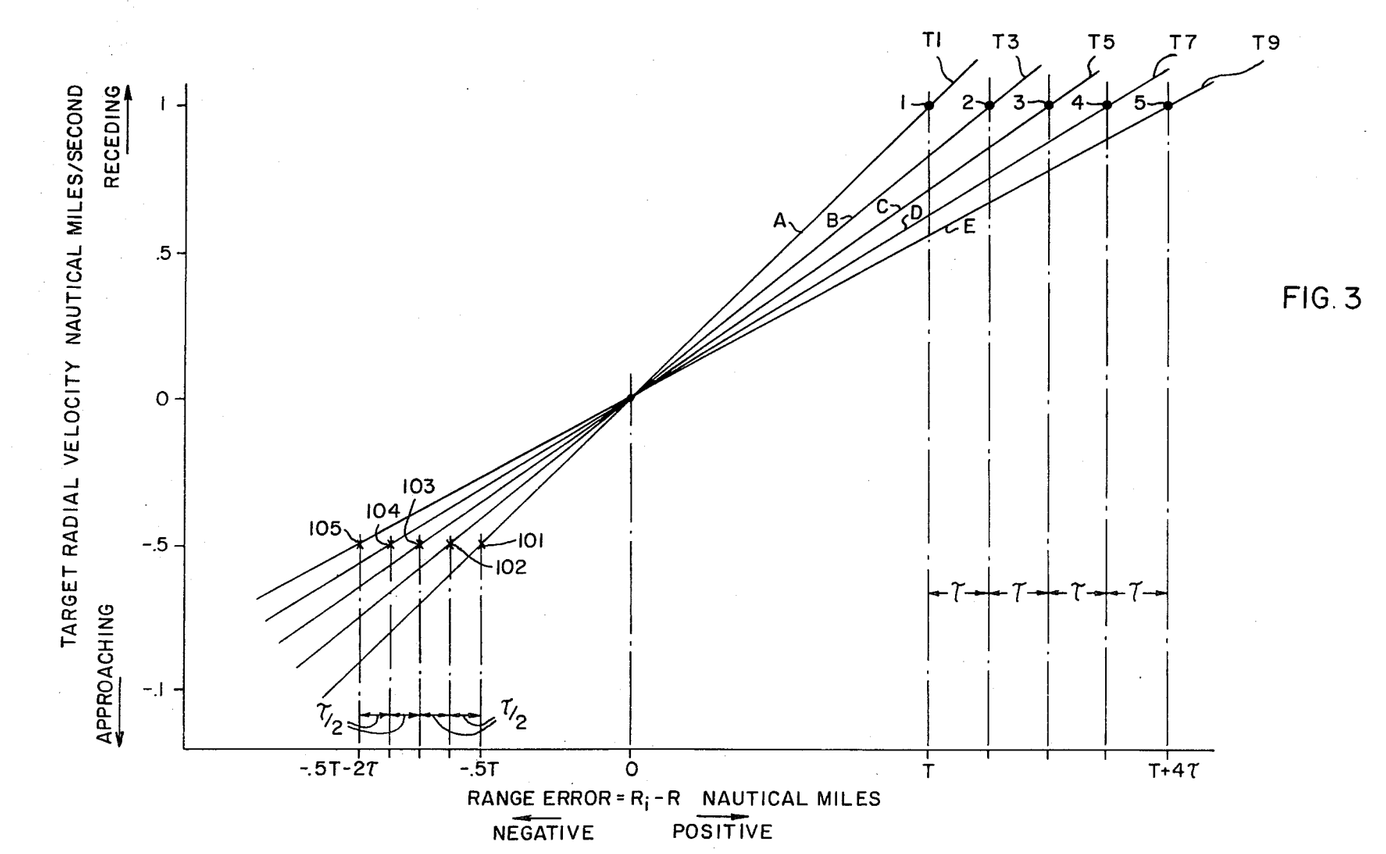
FIG. 3 shows target range error versus target velocity with $T_N$ of the transmitted signal adjusted.
Figure 4:
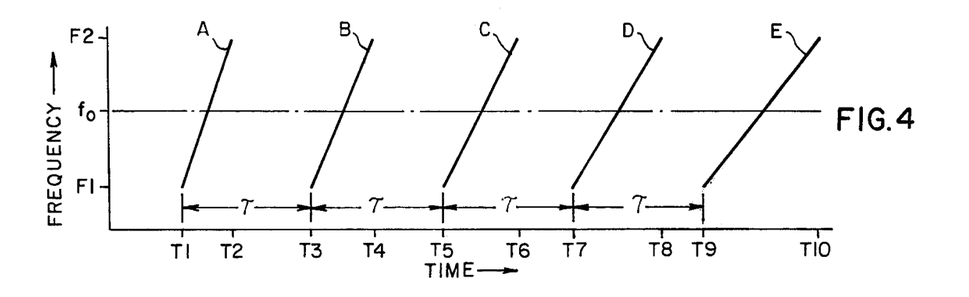
FIGS. 4 and 5 show a transmitted sequence of signals wherein the FM rates are modified to normalize target range.

This operation is illustrated in FIG. 3. In FIG. 3 the range error on the abscissa versus the velocity on the ordinate is plotted for target reflected signals of a sequence of five spaced apart FM signals, transmitted at times O, $\tau$, $2\tau$, $3\tau$, and $4\tau$ or at time T1, T3, T5, T7, and T9 as shown in FIG. 4. Each of these transmissions has the value of $T_N$ adjusted so that $T = T_N + \tau (N-1)$ according to equation (15) or the FM slope, $S_N = f_o/(T_1\text{-}\tau(N\text{-}1))$ according to equation (16). The effect on two different moving targets is shown. The first target, traveling with a radial velocity of 1 nautical mile (n.m.)/sec., is shown in sccessive positions 1, 2, 3, 4, and 5 by the circles on the diagram in FIG. 3. On the first FM pulse transmitted at reference time T1 as shown in FIG. 4, the apparent range is given by equation (1) as $R_i = R + VT$, so that the range error $= R_i - R = VT$ or $T$ where $V = 1$ n.m./sec., as shown on FIG. 3. On each successive pulse at times T3, T5, T7 and T9, the target moves $V\tau$ or $\tau$n.m. to position 2 from position 1, so that the range error must increase by the same amount to give the same indicated range. As shown, the variation in $T_N$ given by equation (15) or $S_N$ given by equation (16) makes each of the successive curves, A, B, C, D and E in FIG. 3 pass through the position of the target such as positions 1, 2, 3, 4 and 5 at the time of the appropriate transmitted pulse at T1, T3, T5, T7 and T9, so that for all transmitted FM pulses, the target appears in the same range cell or bin and the successive FM signals in the sequence can be integrated to improve signal to noise ratio. To illustrate the independence of the effect from the target velocity of the targets, a second target is shown by crosses, moving at a velocity of $-\frac{1}{2}$ n.m./sec. The target motion is now $= V\tau$ or $-\frac{1}{2}\tau$ between successive pulses, and the curves show that at a velocity of $-\frac{1}{2}$ n.m./sec., the spacing between the successive curves in exactly $-\frac{1}{2}\tau$, as required.

Figure 5:
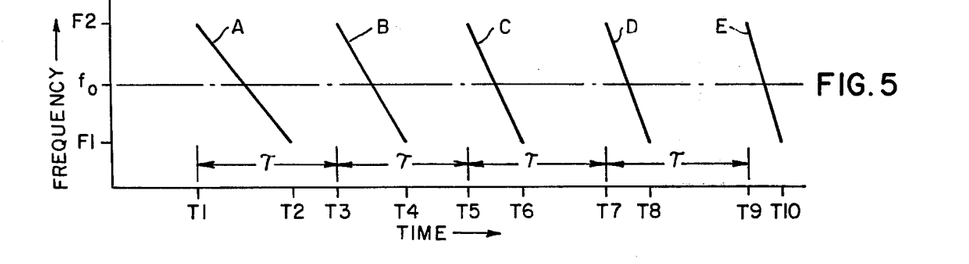

FIG. 4 shows a sequence of N FM pulses represented by curves A, B, C, D and E with a constantly decreasing FM rate wherein the change in FM rate $S_N$ obeys the rule of equation (16). FIG. 5 shows a sequence of transmitted FM pulses represented by curves A, B, C, D and E with constantly increasing FM rate $S_N$ wherein the change in FM rate obeys the rule of equation (16). In FIGS. 1, 4 and 5 the ordinate represents frequency and the abscissa represents time.

Figure 6:
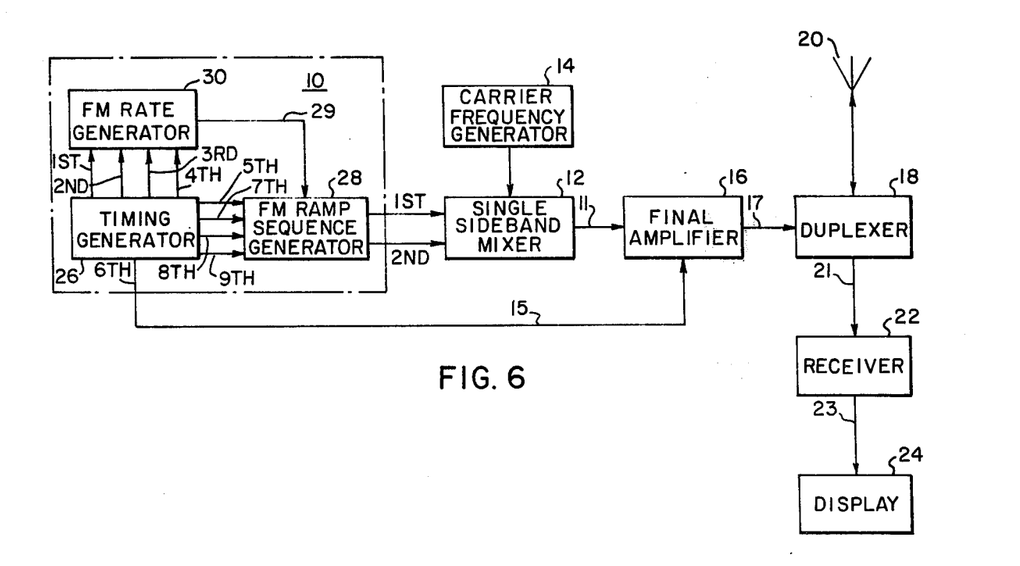
FIG. 6 is a block diagram of one embodiment of the invention.

Referring to FIG. 6, generator 10 provides a predetermined sequence of spaced apart FM signals to single sideband mixer 12. Mixer 12 also has an input from carrier frequency generator 14. The output of single sideband mixer 12 is connected over line 11 to an input of final amplifier 16. A timing signal from generator 10 connects over line 15 to the control input of final amplifier 16. The output of final amplifier 16 is connected over line 17 to an input of duplexer 18. Duplexer 18 is coupled to antenna 20 which radiates and receives RF energy. Received RF energy passes through duplexer 18 and is coupled over line 21 to an input of receiver 22. The output of receiver 22 is connected over line 23 to an input of display 24. Display 24, for example, may be a plan position indicator (PPI). Generator 10 includes a timing generator 26, FM ramp sequence generator 28 and FM rate generator 30. Timing generator 26 provides timing control signals to FM ramp sequence generator 28 to control its operation. Timing generator 26 provides timing control signals to FM rate generator 30 to control its operation. The output of FM rate generator 30 is connected over line 29 to an input of FM ramp sequence generator 28. A first and second output of FM ramp sequence generator 28 is connected to a first and second input of single sideband mixer 12.

Figure 7:
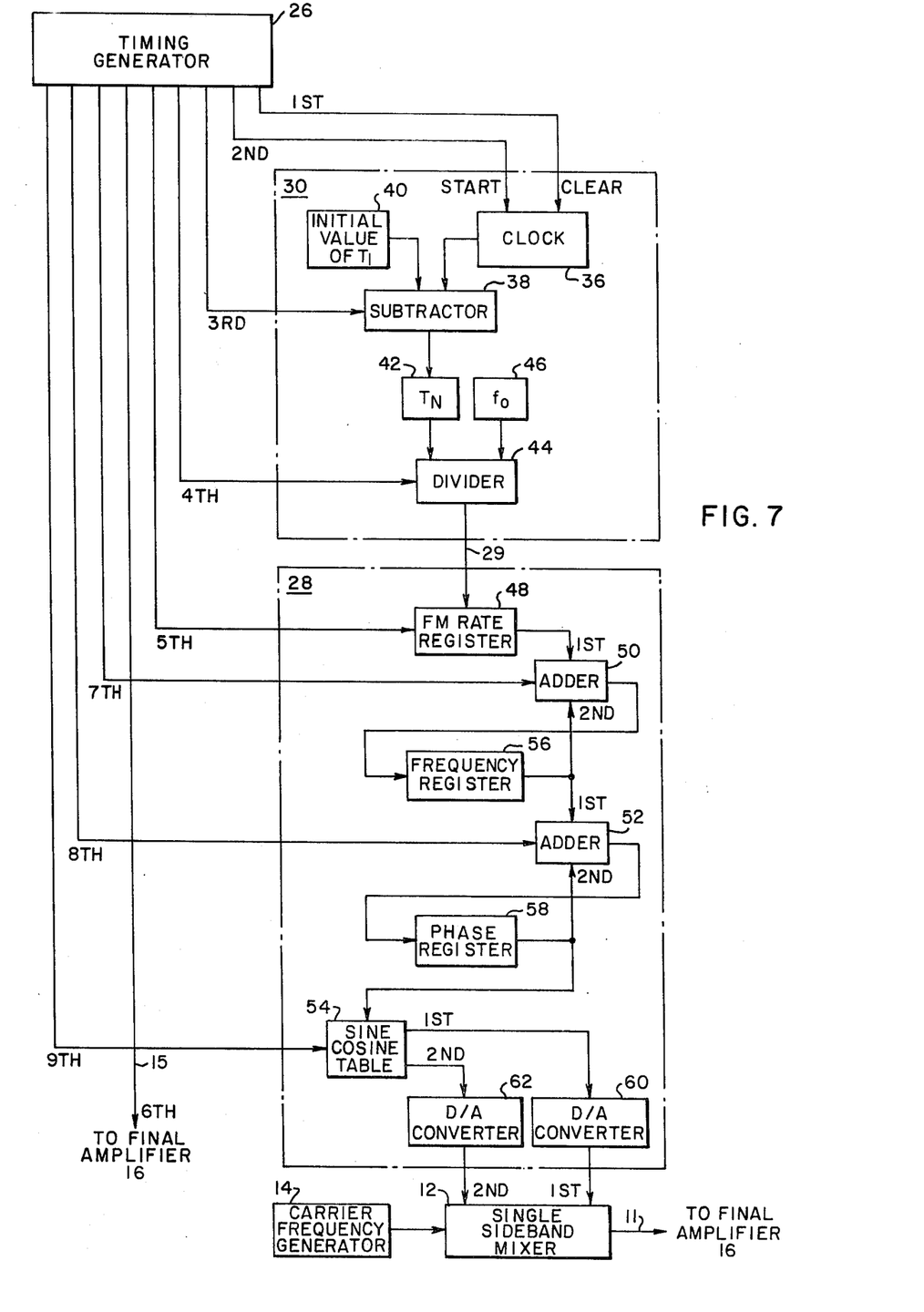
FIG. 7 is a block diagram of an FM ramp sequence generator and FM rate generator.

Generator 10 is described in more detail by referring to FIG. 7. A first signal from timing generator 26 is connected to the clear input of clock 36 which functions to clear clock 36 prior to the start of a sequence of spaced apart FM signals. A second signal from timing generator 26 is connected to the start input of clock 36 to start the clock counting time. The second signal occurs at the start of a sequence of FM signals. A third signal from timing generator 26 is connected to subtractor 38 to cause a subtraction prior to the start of each FM signal. A register 40 holds the value of T which is set in prior to the sequence of FM signals. The output of register 40 is connected to data input of subtractor 38. The output of clock 36 representing the time past since the second (start) signal is connected to the data input of subtractor 38. The results of subtracting the value of the clock from the value of T by subtractor 38 is stored in register 42. The output of register 42 is coupled to the data input of divider 44. Register 46 stores the mean value of the carrier frequency, which is stored prior to the sequence of FM signals. A fourth signal from timing generator 26 is connected to the control input of divider 44 to control the time of division. Divider 44 divides the contents of register 46 by the value stored in register 42. Register 46 serves as the enumerator; and register 42 serves as the denominator. The output of divider 44 is connected over line 29 to the data input of FM rate register 48. A fifth signal from timing generator 26 is connected to the control input of FM rate register 48 and functions to control when the output of divider 44 is stored in FM rate register 48.

A sixth output signal from timing generator 26 is connected over line 15 to the control input of final amplifier 16 to control the amplification and transmission of the sequence of FM pulse signals. A seventh output of timing generator 26 is connected to adder 50 and functions to control adder 50. An eighth output of timing generator 26 is coupled to adder 52 and functions to control adder 52. A ninth output of timing generator 26 is coupled to sine-cosine table 54 and functions to control when sine-cosine table 54 has an output. The data output of FM rate register 48 is connected to one data input of adder 50. Frequency register 56 has an output coupled to the second data input of adder 50. The output of adder 50 is connected to the data input of frequency register 56. The output of frequency register 56 is connected to a first data input of adder 52. An output of phase register 58 is connected to a second data input of adder 52. The output of adder 52 is connected to the data input of phase register 58. The output of phase register 58 is connected to the input of sine-cosine table 54. A first output of sine-cosine table 54 is connected to the input of D/A converter 60. A second output of sine-cosine table 54 is connected to an input of D/A converter 62. The output of D/A converter 60 is connected to the first input of single sideband mixer 12. The output of D/A converter 62 is connected to the second input of single sideband mixer 12.

Figure 8:
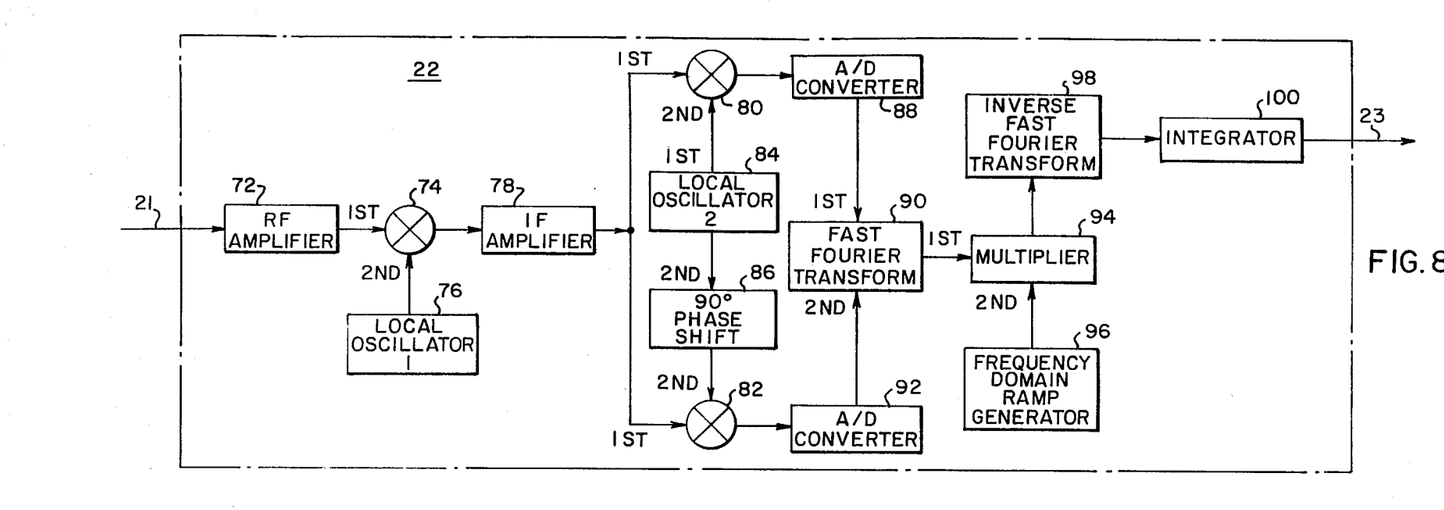
FIG. 8 is a block diagram of a receiver.

FIG. 8 shows one example of the detail design of a receiver 22. The input to receiver 22 is connected over line 21 to RF amplifier 72 having an output connected to the first input of mixer 74. Local oscillator 76 has an output connected to a second input of mixer 74. Mixer 74 has an output connected to an input of IF amplifier 78. The output of IF amplifier 78 is connected to the first input of mixer 80 and the first input of mixer 82. Local oscillator 84 has a first output connected to the second input of mixer 80 and a second output connected to the input of 90° phase shift 86 which has an output connected to the second input of mixer 82. The frequencies of local oscillator 76 and 84 are adjusted such that the sum of the frequencies is equal to the frequency of carrier frequency generator 14 shown in FIG. 6. The output of mixer 80 is connected to an input of analog to digital (A/D) converter 88 having an output connected to the first input of Fast Fourier transform 90. The output of mixer 82 is connected to the input of A/D converter 92 having an output connected to the second input of Fast Fourier transform 90. The output of Fast Fourier transform 90 is connected to the first input of multiplier 94. Fast Fourier transform 90 has the function of transforming the input data at its first and second input from the time domain to the frequency domain at its output. Frequency domain ramp generator 96 has an output connected to the second input of multiplier 94. Frequency domain ramp generator 96 has the function of generating an FM ramp signal equivalent to the FM signal generated by generator 10, except the signal is in the frequency domain instead of the time domain. Multiplier 94 multiplies the first input by the second input and has an output which is connected to inverse Fast Fourier transform 98. Inverse Fast Fourier transform 98 has the function of transforming the input which is in the frequency domain to the time domain at its output. The output of inverse Fast Fourier transform 98 is connected to the input of integrator 100. Integrator 100 functions to accumulate the output of the inverse Fast Fourier transform 98 in the time domain in which the increments may represent range cells in the receiver. A time increment may be with respect to the delay of the signal from when the pulse was transmitted and reflections received. The output of integrator 100 may be the output of receiver 22 and is connected over line 23 to a PPI display 24 shown in FIG. 6 which is conventional in the art.

Figure 9:
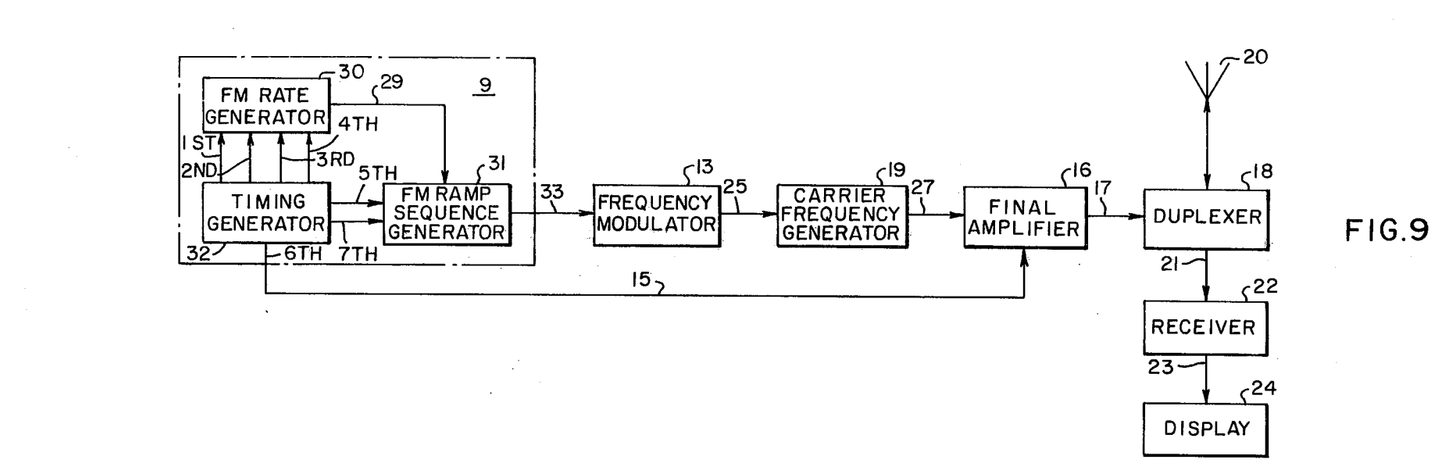
FIG. 9 is a block diagram of an alternate embodiment of the invention.

An alternate embodiment of the invention as shown in FIG. 9 which is similar to the embodiment of the invention shown in FIG. 6 except FM ramp sequence generator 28 has been replaced with FM ramp sequence generator 31, single sideband mixer 12 has been replaced with frequency modulator 13 and carrier frequency generator 14 has been replaced with carrier frequency generator 19. Generator 9 provides a sawtooth or ramp voltage signal to the input of frequency modulator 13 which may for example be a varactor diode. Frequency modulator 13 is coupled over line 25 to carrier frequency generator 19. Carrier frequency generator 19 has an output coupled over line 27 to the input of final amplifier 16. Frequency modulator 13 functions to modulate or change the frequency of the output of carrier frequency generator 19 in response to the input voltage to frequency modulator 13. Frequency modulator 13 for example may vary the capacitance on line 25 which contains an RF signal and is part of the oscillator circuit of carrier frequency generator 19. Spaced apart FM signals in a sequence are therefore generated under the control of FM ramp sequence generator 31. Blocks identified by reference characters which are the same as those found in FIGS. 6 and 7 are identical and have the same function and structure.

Figure 10:
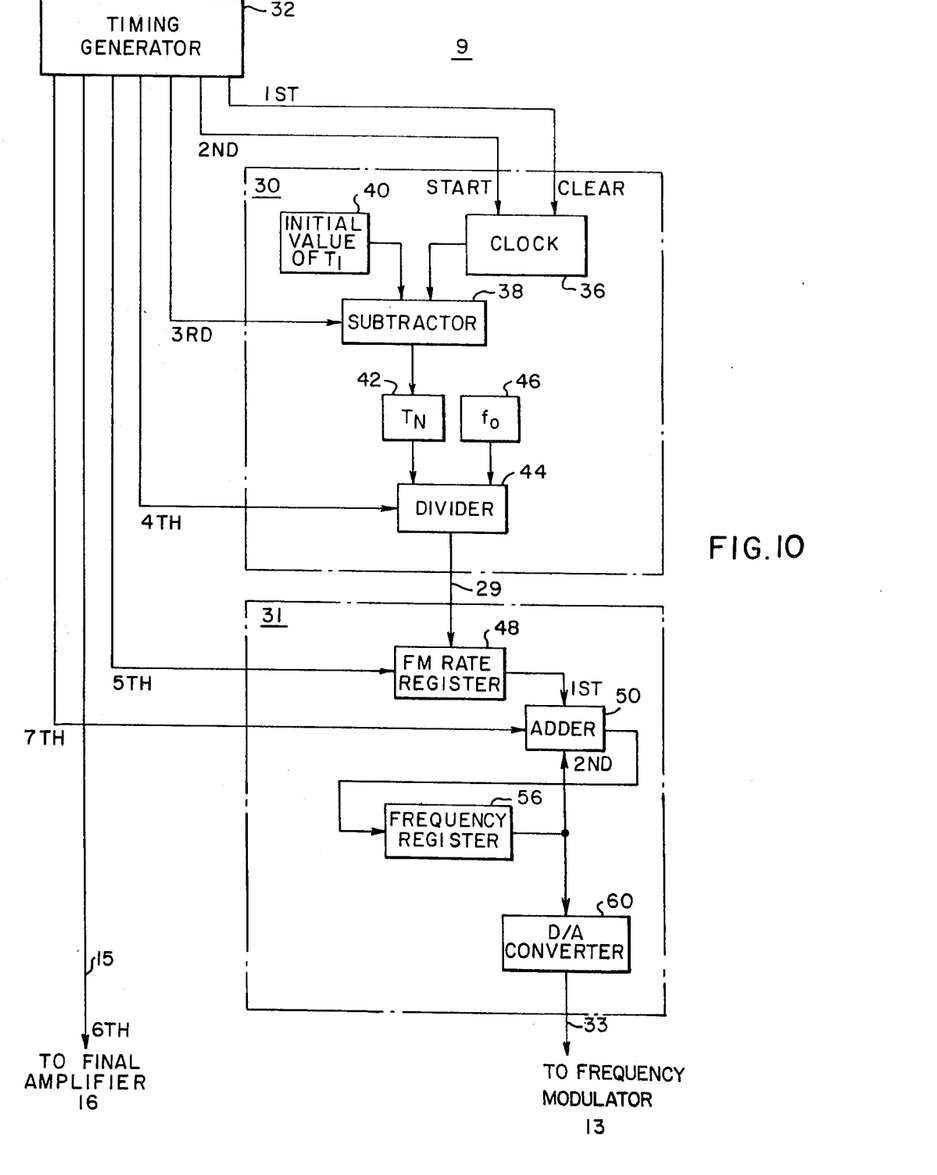
FIG. 10 is a block diagram of generator 9.

A block diagram of generator 9 is shown in FIG. 10. Timing generator 32 is the same as timing generator 26 shown in FIGS. 6 and 7 except the circuitry required to generate the eighth and ninth output signals are deleted as well as the eighth and ninth output signals which are no longer needed. FM ramp sequence generator 31 has an input from FM rate generator 30 and two inputs from timing generator 32 which are the fifth and seventh output. The output of FM rate generator 30 is coupled over line 29 to FM rate register 48. The output of FM rate register 48 is coupled to a first input of adder 50. The output of frequency register 56 is coupled to the second input of adder 50. The output of adder 50 is coupled to the input of frequency register 56. The fifth output of timing generator 32 is coupled to FM rate register 48 to control the time when the data over line 29 is stored in FM register 48. A seventh output signal from timing generator 32 is coupled to adder 50 to control the time of addition of adder 50. The output of frequency register 56 is coupled to the input of D/A converter 60. The output of D/A converter 60 is coupled over line 33 to frequency modulator 13 shown in FIG. 9. FM rate register 48, adder 50, frequency register 56, and D/A converter 60 operate together to generate a sawtooth or ramp voltage signal on line 33.

In operation, generator 10 shown in FIG. 6 generates a sequency of FM signals and feeds these signals to single sideband mixer 12. A typical value for the number, N, of FM pulses in a sequence is 10. The typical value of time between FM pulses, $\tau$, is 70 milliseconds. A typical value for frequency variation of the FM signal is 250 kHz in a first mode or 500 kHz in a second mode of operation. A typical value for T in equation (15) is 30. If the carrier frequency $f_o$ is 435 megahertz, then the typical rate of the first FM signal in a sequence is 14.5 megahertz per second. If the first FM signal has a frequency variation of 500 kHz then the pulse duration of the first FM signal would be about 30 milliseconds, which would correspond to the time T1 to T2 in FIG. 4. As shown in FIG. 6, generator 10 may generate a negative frequency which increases through 0 frequency which is controlled by the direction of phase of the FM ramp signal. The FM signal is mixed with a carrier frequency in the signal sideband mixer 12 to provide a carrier frequency with a frequency modulation of plus and minus the FM ramp frequency.

An alternate method and embodiment of the invention shown in FIG. 9 would be to have generator 9 modulate the carrier frequency of carrier frequency generator 19 by frequency modulator 13 such as with a varactor diode to generate an FM carrier frequency signal which would then be fed to the final amplifier 16.

Referring now to the embodiment of the invention shown in FIGS. 6 and 7, register 40 shown in FIG. 7 holds the initial value of T, for example, the value 30. Clock 36 has previously been cleared to 0. Prior to the first signal in the sequence, register 42 would hold the value of register 40 which in this case would be 30, since during the subtraction in subtractor 38, the value of the clock was 0. Register 46 would hold the value of the carrier frequency, which for example, typically would be 435 megahertz. Upon a signal on the fourth signal line from timing generator 26, divider 44 would divide the value of register 46 by the value of register 42, which in this case would be 435 megahertz divided by 30, which is equal to 14.5 megahertz per second. Upon a signal on the fifth signal line from timing generator 26, the output of the divider 44 would be stored in FM rate register 48, which for example would be the value 14.5 megahertz per second, which is the value for the first FM signal in the sequence according to equation (16), such as shown by curve A in FIG. 4.

To generate curve A in FIG. 4, the value in the FM rate register 48 is added to the value in the frequency register 56 by adder 50. The frequency register stores the value of the starting frequency. The output of adder 50 is stored in the frequency register 56. Typically, the FM rate register 48 holds 22 bits and the frequency register 56 holds 30 bits. The next operation is that the value in the frequency register 56 is added to the value in the phase register 58 by adder 52. The phase register 58 initially holds the value of 0. The phase register 58 typically stores 30 bits. The output of adder 52 is stored in phase register 58. The value in the phase register 58 is used, through the use of sine-cosine table 54, to generate the sine and cosine of the value in the phase register 58. With initial values stored in the FM rate register 48 and the frequency register 56, the value of frequency in phase for the desired waveform is maintained in real time in the frequency register 56 and phase register 58 with timing signals from timing generator 26. The values of these sines and cosines from sine-cosine table 54 are then the digital representation, typically 6 bits, at baseband frequency, of the in-phase and quadrature components of the desired FM ramp. These are converted into analog form through the digital to analog converters 60 and 62, and then mixed up to the final output frequency in the single sideband mixer 12. For proper operation, the values of the sine and cosine, typically 6 bits, should be provided to the D to A converters 60 and 62, typically 6 bits, at a rate of at least once every 180° phase change at the maximum FM frequency for each sine and cosine component.

The second FM signal, curve B in FIG. 4 for example, which is in a sequence of spaced apart FM signals curves A, B, C, D and E is generated by generator 10 after an interpulse period $\tau$ from T1 to T3 of, for example, 70 milliseconds. Since the start of the first FM signal T1, clock 36 has been counting the time lapsed. The FM rate for the second FM signal, curve B, is determined by FM rate generator 30. Specifically, subtractor 38 subtracts the value in the clock 36 from the initial value of T in register 40 to provide the value $T_N$ in register 42. The value T in register 42 is divided into the value stored in register 46, the carrier frequency, by divider 44. The output of divider 44 is the new FM rate for the second FM signal which is stored in FM rate register 48. The frequency register 56 is reset to the starting or initial frequency of the FM signal, and the value in the phase register 58 is set to 0. FM ramp sequence generator 28 is then operated in the same manner as it was during the first FM signal.

Following an interpulse period of another 70 milliseconds from T3 to T5, a third FM signal from T5 to T6, curve C, is generated in the same manner as the second FM signal, curve B, except that the value in clock 36 is a measure of time lapse from the start of the first FM signal T1 to the present time T5. This time is subtracted from the value in register 40 by subtractor 38 to generate the value $T_N$ which is stored in register 42. The new FM rate value is determined by divider 44 and is stored in FM rate register 48. For the third FM signal, FM ramp sequence generator 28 is operated in the same manner as it was to generate the second FM signal. Generator 10 may be operated to provide a sequence of ten FM signals, each signal having a FM rate determined by a function of the amount of time since the sequence started. In this manner, a different FM rate is generated for each FM signal, whereby the apparent range of the received waveform reflected from a target will be unchanged in the receiver.

The operation of the receiver 22 as shown in detail in FIG. 8 is described as follows. A received reflected FM signal is amplified by RF amplifier 72 and mixed with a signal from local oscillator 76 in mixer 74. The output of mixer 74 is amplified by IF amplifier 78 and mixed with the in-phase and quadrature signal of local oscillator 84 in mixers 80 and 82. The outputs of mixers 80 and 82 are converted by A/D converters 88 and 92 to digital form. The output of the A/D converters 88 and 92 are fed to the first and second inputs of Fast Fourier transform 90. The Fast Fourier transform 90 transforms the input signals in the time domain to the frequency domain at its output. Frequency domain ramp generator 96 generates the Fourier transform of the transmitted FM signal which may be generated internally and is multiplied by the received signal in the frequency domain in multiplier 94. An inverse Fast Fourier transform 98, IFFT, then converts back the output of multiplier 94 to the time domain, where the signal is now a compressed pulse in the time domain. The combination of Fast Fourier transform 90, multiplication by the ramp generator 96, and IFFT 98, forms the digital equivalent of a frequency dispersive pulse compression filter. By changing digital numbers fed to or used by the ramp generator 96, the FM rate of the FM signal the receiver compresses can be changed at will to correspond to the transmitted FM signal.

The operation of the alternate embodiment of the invention as shown in FIGS. 9 and 10 may be described as follows. Prior to the start of each FM signal, FM rate generator generates an FM rate signal which is stored in FM rate register 48. The starting frequency of the FM signal is stored in frequency resister 56. The contents of the frequency register 56 and FM rate register 48 are added together in adder 50 and stored in frequency register 56. This sequence is repeated to provide a continually changing frequency signal in frequency register 56 under the control of timing generator 32 by the fifth and seventh output signals. The output of frequency register 56 is converted to an analog voltage by D/A converter 60 on line 33. Frequency register 56 will hold a frequency which is continually increasing or decreasing according to the FM rate stored in FM rate register 48. The analog voltage on line 33 will have a voltage which either increases or decreases in response to the signal from the frequency register. Each FM signal will therefore have a voltage ramp associated for driving the frequency modulator 13. The frequency modulator 13 will modify the carrier frequency of the carrier frequency generator 19 to provide a desired FM signal on the line 27 having the rate of the value stored in FM rate register 48 which is subsequently amplified and transmitted. A sequence of FM signals spaced apart in time is generated by the apparatus as shown in FIG. 9. The operation of blocks identified by reference characters having the same number as those in FIGS. 6 and 7 are operated in the same manner herein.

The invention provides a method and apparatus for detecting moving targets in a single range cell in an FM pulse compression radar by generating a predetermined sequence of spaced apart FM signals, each successive signal in said sequence having an FM rate determined by a function of the amount of time since said sequence started; transmitting the sequence of FM signals; and receiving reflected FM signals whereby signals indicative of a target may be integrated in a receiver at constant range or in a single range bin.

I claim:

1. A method for operating an FM pulse compression radar for detecting moving targets in a single range cell comprising the steps of:
   generating a predetermined sequence of spaced apart FM signals, each successive signal in said sequence having an FM rate determined by a function of the amount of time since said sequence started;
   transmitting said sequence of FM signals; and
   receiving reflected FM signals whereby signals indicative of a target may be integrated in a receiver at constant range.

2. The method of claim 1 wherein said step of generating a sequence of spaced apart FM signals includes the steps of:
   generating timing signals;
   generating FM rate signals;
   generating a sequence of FM ramp signals in response to said timing signals and said FM rate signals;
   generating a carrier frequency; and
   mixing said carrier frequency with said FM ramp signals.

3. The method of claim 2 wherein said step of genertaing a sequence of FM ramp signals includes the steps of:
   starting the FM ramp signals at a minus frequency; and
   terminating the FM ramp signals at a positive frequency.

4. The method of claim 2 wherein said step of generating a sequence of FM ramp signals includes the steps of:
   starting the FM ramp signals at a positive frequency; and
   terminating the FM ramp signal at a negative frequency.

5. The method of claim 2 wherein said step of generating a sequence of FM ramp signals includes the steps of:
   a. generating and storing a first frequency, FM rate and first phase signal for each FM ramp signal in said sequence;
   b. determining and feeding out as a portion of said FM ramp signal the sine and cosine value of said first phase signal;
   c. adding said FM rate signal to said first frequency signal to form a second frequency signal;
   d. adding said first phase signal to said first frequency signal to form a second phase signal;
   e. storing said second frequency signal and said second phase signal as representing said first frequency signal and said first phase signal;
   f. repeating steps (a) through (e).

6. The method of claim 2 wherein said step of mixing includes the step of single sideband mixing.

7. The method of claim 2 wherein said step of generating FM rate signals includes the steps of:
   storing an initial time value T;
   subtracting from the initial time value T the time lapsed since the start of the first signal in the sequence to form a time value $T_N$;
   dividing the value of the carrier frequency by the time value $T_N$ to form a value for the FM rate.

8. The method of claim 1 wherein said step of generating a sequence of spaced part FM signals includes the steps of:
   generating timing signals;
   generating FM rate signals;
   generating a sequence of FM ramp signals in response to said timing signals and said FM rate signals;
   generating a carrier frequency; and
   modulating said carrier frequency with said FM ramp signals.

9. An FM pulse compression radar for transmitting FM signals and receiving reflected FM signals for detecting moving targets in a single range cell comprising:
   means for generating a predetermined sequence of spaced apart FM signals, each succesive signal in said sequence having an FM rate determined by a function of the amount of time since said sequence started;
   means for transmitting said sequence of FM signals; and
   means for receiving reflected FM signals.

10. The radar system of claim 9 wherein said means for generating a sequence of FM signals includes:
   means for generating timing signals;
   means for generating FM rate signals;
   means for generating a sequence of FM ramp signals in response to said timing signals and said FM rate signals;
   means for generating a carrier frequency; and
   means for mixing said carrier frequency with said FM ramp signals.

11. The radar system of claim 10 wherein said means for generating a sequence of FM ramp signals includes:
 means for generating and storing a first frequency, FM rate and first phase signal for each FM ramp signal in said sequence;
 means for determining and feeding out as a portion of said FM ramp signal the sine and cosine value of said first phase signal;
 means for adding said FM rate signal to said first frequency signal to form a second frequency signal;
 means for adding said first phase signal to said first frequency signal to form a second phase signal;
 means for storing said second frequency signal and said second phase signal as representing said first frequency signal and said first phase signal.

12. The radar system of claim 10 wherein said means for mixing includes means for single sideband mixing.

* * * * *